UNITED STATES PATENT OFFICE.

EUGENE HENRY McKAY, OF BATTLE CREEK, MICHIGAN, ASSIGNOR TO KELLOGG TOASTED CORN FLAKE CO., OF BATTLE CREEK, MICHIGAN, A CORPORATION OF MICHIGAN.

MANUFACTURE OF CEREAL FOOD.

1,388,873. Specification of Letters Patent. Patented Aug. 30, 1921.

No Drawing. Application filed June 28, 1919. Serial No. 307,447.

*To all whom it may concern:*

Be it known that I, EUGENE H. McKAY, a citizen of the United States, residing in the city of Battle Creek, county of Calhoun, and State of Michigan, have invented a new and useful Improvement in the Manufacture of Cereal Food, of which the following is a specification.

My invention relates to the treatment of cereals, particularly corn, preparatory to its production, for example, in the form of flakes, either thick or thin.

In the production heretofore of corn flakes, for example, it has generally been the practice to mix the corn in the form of corn or hominy grits with a flavoring material, for instance, sugar, salt or barley malt, or a solution or mixture of these materials, and cook the mixed grits and flavoring material in a steam retort or a rotary steam cooker so as to cook the grains effectually while preserving their identity. The cooked grits are then dried so as to leave them with a more or less toughened or hardened outer coating and a limited percentage of contained moisture, which amounts to about 11% or 12% in the case of thin flakes and about 19% to 21% in the case of thick flakes.

After thus drying the cooked grits, it has usually been the practice to temper them by letting them stand in tempering bins for about three to six days, so as to allow the grits to come to a more even temper and have a more uniform distribution of the contained moisture and resulting softness throughout.

The cooked grits dried and tempered by this usual process are more or less brittle and are not evenly tempered throughout, the outside being usually harder than the inside, so that when subjected, for instance, to the flaking process in the flaking mills, these unevenly tempered grits have a tendency to produce flakes with ragged edges, and to produce dust and waste, and an unnecessarily limited production of flakes.

My improvement consists primarily in subjecting the cereal grits or particles, after cooking and drying as above instanced, and before flaking or forming, to the direct action of steam at a pressure for a time and in a manner to penetrate and soften or temper each grit or particle of cereal evenly throughout, after which the steamed grits or particles are conveyed preferably in their heated condition directly to the mill hoppers and formed or rolled immediately into their final form, such as flakes either thick or thin, by the more or less spaced flaking rolls of the usual kind.

These flakes are then prepared for the market by drying and heating or toasting according to any of the usual or approved methods of treatment.

By this improvement in the treatment of the cereal preparatory to milling, I am enabled to produce corn flakes, for instance, of much better form, character and quality than those produced by the usual methods of preparation, and at the same time greatly to reduce the loss from waste and dust and in practice to more than double the milling capacity of cooked and dried corn flakes per hour.

In order that my invention may be fully understood, I shall first describe in detail the mode in which I at present prefer to carry my improvement into effect, and then define the invention and its scope in the claims.

For clearness, I shall describe how I perform the process in the production of corn flakes, but it will be evident that the improvement is also applicable to the production of other cereals in other forms.

In the production of corn flakes, for example, the application of my improvement is substantially the same in the case of either thick or thin flakes, the principal difference being that in the case of thin flakes the corn contains about 11% to 12% of moisture and in the thick flakes about 19% to 21% of moisture as before stated.

In the production of corn flakes, the corn, preferably in the form of hominy grits, is mixed with flavoring material, such as, for example, sugar, barley, malt, or a mixture of solution of any of these. The mixture of grits and flavoring materials is then cooked, as for example, in shallow pans or steam retorts at a temperature of about 250 degrees Fahr. for about 2½ to 3½ hours, or, as another example, by the rotary method in which the grits are placed inside a revoluble drum and covered with the flavoring material, the steam turned on, the drum slowly rotated and the cooking continued for about one and one half to three hours according to the character of the cereal and the steam pressure used. If the cooking is continued for three hours, the steam pressure would be about fifteen or seventeen pounds.

After cooking by either of the methods described or by another suitable method, the cooked grits may be caused to gravitate to driers or are dried in any approved way until preferably from about 10% to 15% of moisture remains in the grain.

The cooked grits will then have a more or less toughened or hardened dry exterior and a softer moister interior. To soften and temper these cooked and dried grits throughout, I, in my improvement, subject the cooked grits to the direct penetrative action of steam until the grits are evenly softened and tempered throughout, both exteriorly and internally. To accomplish this steaming I at present prefer to pass the cooked grain through a steaming conveyer, consisting of a spiral conveyer revolving in a closed steam casing, into which the steam is admitted through a perforated pipe. The length of time during which the grits are subject to the steaming process and the steam pressure used will vary widely with respect to each other and according to the character and condition of the grain and the other circumstances of the case, but the steaming action continues until the grain is uniformly softened and tempered throughout.

The cooked and dried grain thus steamed is then by preference conveyed directly to the flaking or forming mills, in its hot condition, and is rolled into flakes or otherwise treated according to the particular final product desired.

By this steaming method of tempering the cooked and dried grain, I am enabled to produce corn flakes, for example, with smooth or even, instead of the usual ragged edges and of otherwise greatly improved character and quality, and in addition I save in a great part the dust and waste resulting from the old tempering process, and have in actual practice more than doubled the milling capacity in flakes produced owing to the prompt tempering of the grain and its direct conveyance and treatment in the mills in hot condition.

The flakes thus produced may be dried and toasted, or heated, puffed and toasted, or otherwise treated according to the nature of the final product desired, and as before stated my improvement is applicable also to the treatment of other cereals as well as corn.

Instead of the conveyer described as my at present preferred means of steaming the cooked and dried cereal, any other suitable means may be employed for subjecting every particle of the cooked cereal to the penetrative tempering action of the steam. For example, the cereal may be placed in an ordinary steaming chest and the cereal agitated by any suitable means while being steamed; or perforated steaming pipes may be led into the mill hoppers, but in practice I find the spiral conveyer the best for the cereal steaming and agitating process.

It is evident that many other applications and variations in the performance of my process and in the nature of the product may be made without departing from the boundaries of my invention, for a definition of which reference is to be had to the following claims.

I claim as my invention—

1. The improvement in the process of producing cooked cereal foods by cooking, drying and forming the cereal particles which consists in impregnating the cereal particles with steam after cooking and drying and before forming.

2. The improvement in the process of producing a cooked cereal food, which consists in cooking, drying, impregnating with steam and agitating, rolling and toasting the cereal particles.

3. Cereal flakes consisting of dried or toasted, cooked and steamed cereal particles rolled into flakes having substantially even as opposed to ragged or uneven edges.

4. Corn flakes consisting of dried or toasted, cooked and steamed particles of corn rolled into flakes having substantially even as opposed to ragged or uneven edges.

5. Cereal flakes consisting of dried or toasted cooked and steamed cereal particles of uniform temper throughout rolled into flakes having substantially even as opposed to ragged or uneven edges.

6. Corn flakes consisting of dried or toasted, cooked and steamed particles of corn of uniform temper throughout rolled into flakes having substantially even as opposed to ragged or uneven edges.

EUGENE HENRY McKAY.